United States Patent [19]

Lee

[11] Patent Number: 5,780,089
[45] Date of Patent: Jul. 14, 1998

[54] FLAVOR COMPOSITION

[75] Inventor: Eldon Chen-Hsiung Lee, New Milford, Conn.

[73] Assignee: Nestec S.A., Vevey, Switzerland

[21] Appl. No.: 643,217

[22] Filed: May 3, 1996

[51] Int. Cl.[6] .................................................. A23L 1/22

[52] U.S. Cl. ..................... 426/533; 426/89; 426/534; 426/650; 426/656; 426/661

[58] Field of Search ..................... 426/89, 533, 534, 426/650, 98, 99, 103, 651, 658, 661, 656

[56] References Cited

U.S. PATENT DOCUMENTS

| | | | |
|---|---|---|---|
| 5,079,017 | 1/1992 | Chen et al. | 426/312 |
| 5,158,795 | 10/1992 | Chen et al. | 426/312 |
| 5,603,971 | 2/1997 | Porzio et al. | 426/96 |

*Primary Examiner*—Leslie Wong
*Attorney, Agent, or Firm*—Pennie & Edmonds LLP

[57] ABSTRACT

A flavor composition comprising a complex of a pyrolyzed fat/oil flavor with a gelantinized amylose or a blend of the complex with a protein hydrolyzate as well as foodstuffs containig these flavor compositions.

11 Claims, No Drawings

FLAVOR COMPOSITION

BACKGROUND OF THE INVENTION

The present invention relates to a flavor composition, more particularly to a process for preparing a flavour composition with good stability.

U.S. Pat. No. 5,104,672 describes pyrolyzed fat/oil flavors with characteristic roasted and grilled flavors which are obtained by subjecting a fat or oil in the form of a liquid pool to a temperature of from 300° to 475° C. in the presence of oxygen or air and collecting the volatiles distilled. The pyrolyzed fat/oil flavors are composed of high threshold fatty aldehydes and ketones, i.e. the intensity of flavor/ aroma compounds can be detected at very low levels of concentration by sensory response. When the pyrolyzed fat/oil flavors are blended with protein hydrolysates, the aldehydes and ketones in the pyrolyzed fat/oil flavors tend to react with amine compounds including amino acids, ammonium salts, and peptides in protein hydrolysates and the resulting products on storage lose their characteristic roasted and grilled flavors. Attempts to encapsulate the pyrolyzed fat/oil flavors with common carriers such as maltodextrin or gum arabic have not produced stable products with desired storage requirements.

Retrogradation has long been considered to play an important role in the staling (firming) of bread (Y.Pomeranz, Wheat Chemistry and Technology, Amer. Assoc. of Cereal Chem., 1988, St. Paul, Minn). The role of monoglycerides for retarding starch retrogradation in bread staling is closely associated with their interaction with the starch molecules. An X-ray diffraction pattern characteristic of a surfactant-amylose indicates that surfactant molecules may enter the starch granule and complex with amylose.

SUMMARY OF THE INVENTION

I have found that the fatty aldehydes and ketones in the pyrolyzed fat/oil flavors interact with a gelatinised amylose and form a stable encapsulated complex. Although not wishing to be bound by theory, it appears that the linear carbon chain of the fatty aldehydes and ketones enters the starch granule and may complex with the gelatinised amylose to form a stable, encapsulated, helical, inclusion compound: this theory is based on the indication of an X-ray diffraction pattern characteristic of a surfactant-amylose similar to a fatty acid (pyrolyzed fat/oil)-amylose. The complex could minimize the mobility of the fatty aldehydes and ketones in the pyrolyzed fat/oil flavors and reduce their contact and reaction with the amine compounds in protein hydrolysates when the pyrolyzed fat/oil flavors are blended with protein hydrolysates on storage. The length of glucose units in the amylose may play a critical role in obtaining proper lipophilic-hydrophilic balance for a stable helical, inclusion encapsulated complex.

According to the present invention there is provided a complex of a pyrolyzed fat/oil flavour and a gelatinised amylose.

DETAILED DESCRIPTION OF TITLE INVENTION

The gelatinised amylose used is preferably completely or substantially completely gelatinised and can be obtained from high-amylose starches, e.g. starches containing up to about 70% by weight of amylose, or via the action of debranched enzymes with isoamylase or pullulanase on starches. The gelatinised amylose obtained via the action of debranched enzymes on starches could have better encapsulation efficiency than that obtained from native high-amylose starches which have only limited varieties and amounts of amylose. Some high amylose starches require very high cooking temperatures, e.g. from 154°–171° C. depending on the solid levels being used in order to obtain adequate gelatinisation. If high amylose starches are cooked below such temperatures, e.g. from 90°–100° C., they are only partly gelatinised and, therefore, may have a low encapsulation efficiency. The isoamylase (α-1,6-glucosidase), a debranching enzyme, specifically hydrolyzes the α-1,6-glucoside bonds of branch-chain amylopectin to form amylose without formation of reducing sugars and/or oligosaccharides. Isoamylase may be obtained from broad beans (R-enzyme) or from the fermentation of yeast and bacterial species such as *Pseudomonas* and *Cytophaga*. The isoamylase, Amano DB-250 (Amano Enzyme USA Co., Ltd.) is obtained by a fermentation process from a selected strain of *Bacillus sectorranmus*. Another suitable debranching enzyme is a heat-stable pullulanase, pullulan 6-glucanohydrolase, which hydrolyzes the α-1,6-glucosidic linkages of amylopectin as well as pullulan. The pullulanse, Amano pullulanase #3 (Amano Enzyme USA Co., Ltd.), is obtained by a fermentation process from a selected strain of *Aerobacter sp*. The pullulanase, Novo Promozyme (Novo Nordisk A/S), is obtained from a selected strain of *Bacillus acidopullulyticus* by submerged fermentation. The amount of amylose in hydrolysed starch depends on the hydrolysis conditions as well as the type of starches. One of ordinary skill in the art can readily determine by routine testing the appropriate amount of enzyme to use with any specific hydrolysed starch.

The pyrolyzed fat/oil flavor may be obtained by passing oxygen to and through at least one fatty acid while heating the fatty acid at a temperature of from 150° C. to 475° C. and collecting different volatile fractions evolved over differing periods of time from the heated fatty acid.

More detailed information on the production of the pyrolyzed fat/oil flavor is given in U.S. Pat. No. 5,104,672 the description of which is expressly incorporated herein by reference.

The complex of the pyrolyzed fat/oil flavor and the gelatinised amylose is prepared by intimately mixing the two components, e.g. by homogenisation, followed by drying, e.g. spray drying. The amount of pyrolyzed fat/oil flavor may be from about 1 to 20% and preferably from about 5 to 15% by weight based on the weight of the high amylose starch or the hydrolysed starch containing the amylose.

The complex of the pyrolyzed fat/oil flavor and the gelatinised amylose may be blended with a protein hydrolysate and the present invention also provides a mixture of such a complex of the pyrolyzed fat/oil flavor and a gelatinised amylose with a protein hydrolysate.

The amount of complex may be from about 5 to 150% and preferably from about 20 to 100% by weight based on the weight of the protein hydrolysate.

The flavors can be added to any foodstuffs, particularly culinary products, that are desired to have a savory flavor (from protein hydrolysates) with characteristic grilled and roasted notes (from pyrolyzed fat/oil flavor) e.g. meats, sauces, soups, dips/spreads, gravies, main meals, marinades, seasonings, side dishes, etc. The complex of pyrolyzed fat/oil flavor can be used alone. However, the blend of a protein hydrolysate with the complex of pyrolyzed fat/oil flavor give added value to a protein hydrolysate as an industrial ingredients since both protein hydrolysate and pyrolyzed fat/oil flavor are commonly used in culinary products.

EXAMPLES

The following Examples further illustrate the present invention.

400 g waxy maize starch (20% by weight in an aqueous starch slurry) (Staley Waxy #1) was dispersed in an aqueous solution (2,000 g), cooked to 95° C. for 30 minutes, and then cooled to 50° C. in a Brabender amylograph. Novo Promozyme 200 L (6.0 ml) (Novo Nordisk A/S), containing 200 Pullulanase Unit Novo (PUN)per gram, was added at the use level of 1.5% based on starch (v/w). The hydrolysis reaction was carried out with agitation at the optimum temperature of 50° C. and viscosity was monitored during reaction for 1 hour.

The pyrolyzed oleic acid flavor with intense characteristic roasted and grilled flavor notes was obtained by subjecting oleic acid in the form of a liquid pool to a temperature of 350° C. with stirring in the presence of air and collecting the volatiles distilled. The pyrolyzed oleic acid flavor (100 g) was added into the hydrolyzed waxy maize starch solution (2,000 g). The mixture was homogenized and then spray-dried.

Maltodextrin DE.10 (400 g, 40%) (Maltrin 100, Grain Processing Corp.), and gum arabic (400 g, 30%) (Colony Import Inc.) were solubilised directly in water; Capsul modified starch (400 g, 40%) (National Starch Corp.) was cooked at 95° C. in an aqueous solution until completely gelatinised, β-cyclodextrin (400 g, 40%) (American Maize Corp.) was heated to approximately 60° C. to solubilize in an aqueous solution; Amylomaize corn starch (70% amylose) (American Maize Corp.) was cooked at 95° C. for 30 minutes and solubilized in an aqueous solution. The pyrolyzed oleic acid flavor (100 g) was added into each solution, homogenized, and then spray-dried. The encapsulation of pyrolyzed oleic acid flavor with β-cyclodextrin via precipitation (ppt) was done by agitating and heating-β-cyclodextrin (400 g, 20%) in an aqueous solution (2,000 g) to solubilize at 60° C., adding and homogenizing the pyrolyzed oleic acid flavor (100 g), and then cooling down to ambient temperature. The precipitate formed was filtered and dried in a vacuum-oven at 60° C. for 4 hours.

The total oil, and surface oil of the above encapsulated samples are analyzed and given as follows:

| Encapsulating Agent | Oil/Agent Starting, % | Total oil % | Surface oil, % | Encapsulated oil, % | Encapsulation Efficiency, % |
|---|---|---|---|---|---|
| 1) Debranched Waxy Maize Starch | 20/80 | 18.09 | 7.42 | 10.67 | 53.35 |
| 2) Maltrin 100 | 20/80 | 17.39 | 11.50 | 5.89 | 33.87 |
| 3) Gum Arabic | 20/80 | 18.74 | 0.13 | 18.61 | 93.05 |
| 4) Capsul starch | 20/80 | 20.04 | 0.26 | 19.78 | 98.90 |
| 5) β-Cyclodextrin (spray-dried) | 20/80 | 19.66 | 12.10 | 7.56 | 37.80 |
| 6) β-Cyclodextrin (ppt) | 20/80 | 18.20 | 13.00 | 5.20 | 26.00 |
| 7) Amylomaize VII (70% amylose) | 20/80 | 19.27 | 17.30 | 1.97 | 10.22 |

The results showed that the enzyme-debranched waxy maize starch gave higher inclusion encapsulation capacity than β-cyclodextrin and native high-amylose Amylomaize VII corn starch (70% amylose). This is because Amylomaize VII was not cooked to a high enough temperature to have adequate gelatinisation (typically 154°–171° C.) and therefore its encapsulation efficiency was very low due to inactive non-gelatinised crystalline amylose. In contrast, waxy maize starch was completely gelatinised at 95° C. (typically the gelatinisation temperature is approximately 70° C.) and enzyme-debranched to have high active amylose to form a complex with a pyrolysed fat/oil flavor. It is ideal that the load of pyrolyzed oleic acid flavor shall be within their inclusion encapsulation capacity.

60 parts of the above encapsulated samples were blended with 800 parts of protein hydrolysate (Maggi HPP 4BE), and stored in a sealed container at 30° C. for 4 months. The stored samples were organoleptically evaluated against their samples in frozen storage as controls in hot water at the usage of 1%. The enzyme-debranched waxy maize starch sample gave the least off-flavor deterioration among the samples on storage whereas the β-cyclodextrin samples gave weak flavor profile due to its insolubility problem. Gum arabic and capsul lipophilic starch had very high encapsulation efficiency, but their samples gave off-flavor after storage. The encapsulated pyrolyzed oleic acid flavor in gum arabic and capsul starch could mobilize and react with the amine compounds in protein hydrolysates on storage at hot room temperatures. The resulting products on storage lost characteristic roasted and grilled flavors with off-flavor notes.

EXAMPLE 2

Waxy maize starch (20%) (Staley Waxy #1)and Amano DB-250 isoamylase (α.1,6-D-glucosidase) (Amano Enzyme USA Co., Ltd.) (300 units/ml) at the use level of 2% based on starch (v/w) were used instead of the Novo Promozyme 200 L pullulanase as described in the Example 1. The hydrolysis reaction was carried out with agitation at the temperature of 25° C. for 1 hour. The hydrolyzed waxy maize starch solution was used to encapsulate the pyrolyzed oleic acid flavor and the encapsulated sample was blended with Maggi protein hydrolysate HPP 4BE as described in the Example 1. The storage study showed that both of the hydrolyzed waxy maize starch samples with Novo Promozyme 200 L pullulanase and Amano DB-250 isoamylase gave similar good flavor stability.

I claim:

1. A complex of a pyrolyzed fat/oil flavor and a completely gelatinised amylose.

2. A complex according to claim 1 wherein the completely gelatinised amylose is obtained from high amylose starches or via the action of debranched enzymes with isoamylase or pullulanase on starches.

3. A complex according to claim 1 wherein the pyrolyzed fat/oil flavor is obtained by passing oxygen to and through at least one fatty acid while heating the fatty acid at a temperature of from about 150° C. to 475° C. and collecting different volatile fractions evolved over differing periods of time from the heated fatty acid.

4. A process for the preparation of a complex according to claim 1 which comprises intimately mixing the pyrolyzed fat/oil flavor and the amylose.

5. A process according to claim 4 wherein the amount of pyrolyzed fat/oil flavor is from about 1 to 20% by weight based on the weight of the hydrolyzed starch containing the completely gelatinised amylose.

6. A mixture comprising a first component of a complex of a pyrolysed fat/oil flavor and a completely gelatinised amylose, with a second component of a protein hydrolysate.

7. A mixture according to claim 6 wherein the amount of the complex is about 5 to 150% by weight based on the weight of the protein hydrolysate.

8. A foodstuff comprising a complex according to claim 1 added in an amount effective to impart grilled and roasted notes.

9. A foodstuff comprising a mixture according to claim 6 added in an amount effective to impart savoury flavor and grilled and roasted notes.

10. The foodstuff of claim 9 wherein the amount of the complex is from about 5 to 150% by weight based upon the weight of the protein hydrolysate.

11. A complex of a pyrolysed fat/oil flavor and a completely gelatinised amylose prepared by mixing the pyrolysed fat/oil flavor with a hydrolysed starch which contains the completely gelatinised amylose in an amount of about 1 to 20% by weight of the pyrolysed fat/oil flavor based on the weight of the hydrolyzed starch.

* * * * *